United States Patent [19]

Beauman et al.

[11] 4,396,512

[45] Aug. 2, 1983

[54] BACTERIOSTATIC FILTER MEDIA

[75] Inventors: William H. Beauman, Chicago; P. Regunathan, Villa Park; Dennis I. Prepejchal, Woodridge, all of Ill.

[73] Assignee: Everpure, Inc., Westmont, Ill.

[21] Appl. No.: 187,459

[22] Filed: Sep. 15, 1980

Related U.S. Application Data

[63] Continuation of Ser. No. 44,420, Jun. 1, 1979, abandoned.

[51] Int. Cl.$^3$ ............................................. B01D 37/02
[52] U.S. Cl. .................................... 210/668; 210/266; 210/501; 210/502; 210/694; 210/764
[58] Field of Search ............... 210/684, 694, 764, 501, 210/502, 282, 668

[56] References Cited

U.S. PATENT DOCUMENTS

| | | | |
|---|---|---|---|
| 2,785,106 | 3/1957 | Mendelsohn | 210/501 X |
| 3,268,444 | 8/1966 | Renn | 210/501 X |
| 3,872,013 | 3/1975 | Nishino et al. | 210/501 X |

FOREIGN PATENT DOCUMENTS

| | | | |
|---|---|---|---|
| 982779 | 2/1976 | Canada . | |
| 2544230 | 4/1977 | Fed. Rep. of Germany | 210/501 |

*Primary Examiner*—Ferris H. Lander
*Attorney, Agent, or Firm*—Dulin & Thienpont, Ltd.

[57] ABSTRACT

Improved bacteriostatic filter media mixture comprising specially treated, dried, silver-bearing, highly purified, inert material in particulate or fibrous form, such as cellulose fibers, mixed with specific proporations of powdered, activated carbon filter material. Bacterial growth in and on the filter media is inhibited by silver ions slowly eluted or dissolved from the segregated, silver-treated cellullose fibers uniformly interspersed among the carbon filter material. The treated cellulose in the mixed filter media is in an amount sufficient to provide overall filter bacteriostatic effect to passs EPA Office of Pesticides Regulations FR 41:152 for home water filtration use, and to have improved coliform bacteria suppression after stagnant periods. Adsorptive and precoatability properties of the carbon are not inhibited, and carbon densification, leading to fall-off, does not occur.

12 Claims, No Drawings

4,396,512

BACTERIOSTATIC FILTER MEDIA

This is a continuation, of application Ser. No. 44,420 entitled Bacteriostatic Filter Media filed June 1, 1979, now abandoned.

BACKGROUND AND FIELD

Powdered carbon as a water filtration media has come into extensive, relatively recent use for supplanting other types of media, principally cellulose. While neither cellulose nor powdered carbon are inherently bacteriostatic, the carbon does have the advantage of permanence, i.e., is non-biodegradable, and has good affinity for organic pollutants. The organics, due to their ever-growing quantity, chemical diversity, unknown long-range effect, and potential for highly serious health hazards, have been the subject of increased regulatory attention. Accordingly, water filters containing powdered carbon have posed a good approach to improved water quality.

A particularly useful filter media and configuration is shown in the Oliver U.S. Pat. No. 3,055,503 which employs a pleated filter element in a quick-change type of cartridge. The drainage grid has a balanced pressure design which permits even deposition of the precoatable carbon filter particles thereon.

A major problem with all types of water filters is that bacteria adsorb to the solid/liquid interface, and accordingly can multiply in and on the filtration media. If there is no bacterial control, the effluent bacterial count can rise beyond acceptable limits, particularly during times the filter is not in use.

As noted, carbon is not inherently bacteriostatic. One of the better, well-known bacteriostatic agents is silver. For example, U.S. Pat. No. 2,040,806 shows a fibrous material treated with silver has disinfectant properties. U.S. Pat. No. 2,701,792 shows that agents having bacteriostatic properties can be used to treat activated carbon filtering media. U.S. Pat. No. 2,785,106 treats alpha cellulose with silver nitrate.

However, silver applied to granular or powdered carbon for filter media poses several hitherto unsolved problems. Principal among these is that the process of treatment is extremely messy and in many instances difficult to control the quantity of silver deposited on the powdered carbon. Further, the price of silver is increasing, and the process has become extremely costly. Also, the energy-extensive processing costs of treating all of the filter media, as composed to treating only a small portion of it, is best avoided. Even more significant, the treatment of the powdered carbon with the silver can change its properties so that it is no longer efficiently suitable for filtration, particularly in the case of the precoat types of filter assemblies. Treatment of the powdered carbon in such filters typically requires increase in the amount of carbon due to the loss of sorbative properties, which in turn results in increased costs.

All types of fibers are not a good filtration media in view of the fact that they may be difficult to handle when wet, may not precoat well as they may tend to become lumpy, may not disperse well, and may be biodegradable. They have a lower affinity for organics than carbon. Thus, a filter of fibers alone, even where treated with silver, would require large quantities in order to overcome the inherent problems of low filtering efficiency. We do not believe that cellulose used alone would be suitable in a precoat-type filter because of its characteristics. Further, due to the biodegradable nature of untreated cellulose, we would expect erratic performance due to potentially varying rates of bacterial degradation of the cellulose from filter to filter.

Accordingly, there is a very significant need for an effective filtration media which has the advantages of precoatable powdered carbon, yet can have the advantages of bacteriostatic properties to prevent bacterial build-up when that media is used in various types of filters, and is capable of passing the current EPA standards in regard to effluent bacterial count, filtration efficiency, and low silver elution.

THE INVENTION

Objects

It is among the objects of this invention to provide an improved water filtration media comprising a mixture of a major amount of powdered carbon and a minor portion of bacteriostatically treated cellulose.

It is another object of this invention to provide an improved bacteriostatic filter media comprising silver-treated cellulose and powdered carbon of the precoatable type in proportions that provide for total bacteriostatic effect in the media from a minor portion of cellulose that has been treated with the silver.

It is another object of this invention to provide an improved filter media that meets current EPA regulations in terms of bacteriostatic effect in the filter, yet has a lower amount of silver eluted therefrom.

It is another object of this invention to provide a filter media of the above type, yet which can effectively be used in a precoat type of filter such as described above in U.S. Pat. No. 3,055,503 in that it is evenly dispersible on the filtration surface so that channelization, blind spots, or filter failure do not occur.

Still another and further objects of this invention will become evident from the summary and detailed description of the invention which follows.

Summary

The invention comprises an improved bacteriostatic filter media having a minor proportion of specially treated, dried, silver-bearing, highly purified, inert particulate or fibrous material, preferably powdered cellulose combined intimately with a major proportion of powdered activated carbon of the precoatable type. Filters containing this media and methods of preparation of the filtration media are other aspects of the invention. The cellulose powder employed in this invention is at least of food grade purity, preferably analytic or reagent grade, and is of a wettable type of cellulose having an individual fiber size in the range of 10–1,000 micrometers ($\mu$m) having a range of about 2–25 $\mu$m in diameter and having a density of less than 0.3 grams per cc by the slurry filtration method or less than 0.4 grams per cc by dry tapped volume. The material is impregnated with silver by reducing a soluble salt of silver such as silver nitrate to provide from 1–5% of the dry weight of cellulose as silver, preferably 2–4% silver and most preferably 3% silver.

This silver-treated cellulose is then combined with a powdered carbon filter material of the activated precoatable type in an amount sufficient to provide bacteriostatic effect throughout the entire quantity of activated carbon with an elution of silver not exceeding 50 parts per billion (ppb) during the life of the filter. This will range typically from 1 to 10% by weight of the silver-treated cellulose in the combined filtration media of this invention.

The filter media is then incorporated in various sizes of filtration devices of precoat type. We particularly use a charge of the improved bacteriostatic filter media of this invention in a quick-change type of filtration cartridge as shown in U.S. Pat. No. 3,055,503. Such a filter employing the improved bacteriostatic filter media of this invention is shown to pass the EPA regulations FR 41:152, pp. 32778-32782 (Aug. 5, 1976), and has reduced quantities of effluent bacteria as compared to untreated filter media and low silver elution, below 50 ppb and typically in the range of from about 15-35 ppb.

The silver-bearing material may be any inert, insoluble, non-toxic, precoatable material onto which silver can be adsorbed, and which is hydraulically compatible with precoat-type filter operation. The silver is adsorbed, not bonded, to the inert material, and thus its chemical identity is of little bearing if it has the properties described above. While we prefer cellulose, and more particularly chopped cotton fibers, wood fibers are also suitable. Other materials which can be used include synthetic and natural particulate and fibrous material (of the size range described below) such as rayon, polyolefins (polyethylene, polypropylene), diatomaceous earth, silica, polystyrene, polyester resins, PVC, PVA, and the like. We will refer to cellulose in the detailed description below, but it is only by way of example of the various types of inert materials that can be used.

DETAILED DESCRIPTION

The following detailed description and specific examples are by way of illustration and not by way of limitation of the principles of this invention. More particularly, the filter media of this invention can be used in all types of filter configurations for water filtration treatment.

PREPARATION AND SPECIFICATIONS FOR BACTERIOSTATIC AGENT COMPONENT

The bacteriostatic agent which is intimately dispersed throughout the powdered carbon filtration material to form the mixed filter media of this invention comprises an inert material (such as a cellulose) having the following specifications: The inert material of cellulose shall be of at least food grade purity, preferably analytic or reagent grade. The inert material or cellulose should be easily and instantly wettable which may be determined as follows: A pinch of the dry material when dropped onto the surface of water shall neither spread out or ball up on the surface. Instead, it should immediately begin to absorb water by capillary action and sink below the surface.

The inert material or cellulose should also disperse freely when suspended in water. Thus, in the test noted above for wettability, as the pinch of inert material sinks below the surface, the material should not retain its identity as a single mass, like a cotton ball, but should disperse into tiny particles by itself. If the inert material is supplied in compressed form, a small amount should be reduced to a powder in a mortar and pestle for testing as noted above for wettability and dispersion characteristics.

Upon dispersing of the inert material in water to form a slurry, that slurry should appear homogenous with no kinks, knots, snarls, balls or the like evident. Under microscopic examination, the slurry should not have aggregates of more than 10 particles or fibers, nor any aggregates having a dimension of larger than 500 $\mu$m.

With regard for particle size, in the case of powdered material, the mean diameter may range from 2-100 $\mu$m and preferably from 5-20 $\mu$m. For fiber forms, the individual fiber size of the inert material (e.g., cellulose) should be within a range of 10-1,000 $\mu$m in length, with a mean of 100-500 $\mu$m. The fiber (e.g., cellulose) diameter should range from 2-25 $\mu$m, with a mean of from 5-10 $\mu$m. The inert material should have a dry tap density of less than 0.40 grams per cc, or less than 0.30 grams per cc when measured by the slurry filtration method.

PROCEDURE FOR RENDERING CELLULOSE BACTERIOSTATIC

Powdered cellulose of the type and purity described above is mixed with distilled water to make a slurry. An amount of reagent grade silver nitrate, or other soluble salt of silver, sufficient to provide an amount of silver equal to from 1-5% of the dry weight of the cellulose, preferably 2-4% and typically 3%, is added as a solution in distilled water to the cellulose slurry with stirring. This solution is then chemically reduced by addition of reducing agents, alone or in combination, such as sulfite salts, hydrazine, formaldehyde or the like. This results in individual particles of elemental silver being introduced onto and into the individual fibers of cellulose. After the reaction is completed, the silver-impregnated cellulosic fibers are rinsed thoroughly with distilled water and dried.

More specifically, 30 gallons of distilled water are added to a 50-gallon tank into which is added while stirring 11.25 kg of the above-described cellulose powder. The mixture is stirred into a slurry. In a separate container, dissolve 750 grams silver nitrate in 2-3 gallons of distilled water, and carefully pour this into the slurry while mixing. In another separate container, dissolve 1930 grams of sodium sulfite, 300 grams of sodium hydroxide, and 950 mililiters of formaldehyde in 5 gallons of distilled water. This reducing solution is then added slowly to the slurry while stirring. The mixing continues for 10-15 minutes, is then stopped, and the slurry allowed to settle. The supernatant is then siphoned off and discarded. The remaining thick slurry is completely dewatered by filtration. After the dewatering, the treated cellulose is resuspended in 30 gallons of distilled water, mixed for 10 minutes, let stand to settle, siphoned and filtered again. This cycle of resuspension, mixing, settling, siphoning, and filtration is repeated eight more times to provide a thorough washing of the cellulose fibers. The resulting washed and filtered silver-impregnated cellulose is then dried at 100° C. in an oven and sieved until fluffy. This provides bacteriostatic agents sufficient for approximately 1000 quick-change water filters of the precoat type, such as the Model QC 4 cartridge type filters manufactured by Everpure, Inc. of Westmont, Ill.

FILTER MEDIA PREPARATION

The silver-treated cellulose inert fiber material as described above is then mixed thoroughly with a finely powdered, activated carbon precoat filter material. This activated carbon is typically 100%-200 mesh activated carbon, and is of a powdered type rather than a granular type. This powdered carbon may contain inert materials as conventional filter aids for such activated carbon filter material, for example, diatomaceous earth, silica, alumina and the like. It is thought that these filter aid materials are conventionally supplied to assist in filter cake formation. We prefer to use "MICROPURE" brand precoatable activated powdered carbon material as made by Everpure, Inc. of Westmont, Ill.

10 grams of the filter media of this invention are then employed in a QC-4 cartridge-type, quick change water filter of type type manufactured by Everpure, Inc. in the tests described below. The mixed filter media of this invention is observed to precoat evenly and completely across the exterior surface of the folded filter fabric, providing a cake approximately 0.1 inch (0.254 cm) thick.

In use, excellent bacteriostatic effect is observed as determined by running this filter in the EPA tests for filter media and cartridge, as described in FR 41:152. Less than 50 ppb of silver are eluted during the life of the filter. Typically this is on the order of 15–35 ppb with 18 ppb being usual. The outlet water can be described as clean, bright, taste-free water. Cloudiness and dirt in the water are removed, off-tates and odors are extracted, bacteria pass-through is controlled, and in-situ propagation of bacteria internal to the filter cartridge during stagnant periods is inhibited. The pressure drop across the filter face through the fine layer of filter media is excellent. There is no cake "drop off" due to increased density of the filter media. Neither bed-type channeling nor spool-type of unloading is observed. Asbestos fiber in inlet water is absent from the outlet water indicating efficient filtration. The reduction in outlet bacterial count after stagnant periods indicates that the silver-treated cellulose dispersed throughout the activated carbon filtration material is an effective and efficient source of dissolving silver which permeates the entire media as it dissolves so that bacterial growth in and on the carbon filtration material is inhibited.

COMPARATIVE TEST

This example shows the results of attempting direct impregnation of silver into the activated carbon to impart bacteriostatic properties thereto. The resulting material was unsuitable for precoat-type of filters.

Precoat-type, powdered, activated carbon filter media was impregnated with silver by chemical reduction of a silver salt solution. The silver-treated material was then studied for its precoat and cake-forming abilities by incorporating it into a transparent pressure vessel functionally and hydraulically identical to the above-described QC-4 type filter.

The silver-treated carbon filter media failed to form a slurry when the inlet water flowed into the apparatus, that is, when the apparatus was activated. As a result, cake formation on the surface of the filter was too poor to be acceptable. The cake was uneven, and gaps were visible in several places. It was estimated that only 60% of the filter surface was actually covered by cake.

The silver-treated, activated carbon powder was then moisturized in an attempt to alleviate the problem. This moisturized material did wet adequately to form a slurry, but it still did not form a good precoat cake. It was not evenly deposited, and it fell to the bottom of the vessel when the flow of water was stopped. This is an especially serious disadvantage because it severely reduces the useful lifetime of the filter due to rapid clogging and the concomitant back pressure increase. In addition, it means that each time the water flow is turned on and off, there must be an even filter cake laid down or else filtration gaps will occur.

On further testing it was found that treatment of the carbon filter media with silver resulted in an 18% density increase. While we do not wish to be bound by theory, we believe that this may be a major factor contributing to the drop-off of the cake from the filter surface. This is in addition to the poor wetting characteristics apparently due to the treatment by silver. We concluded that treatment of all or a major portion of the carbon filter media is entirely unacceptable to provide a precoat-type filter having anti-microbial properties. Because of the failure to be able to produce a filter cartridge having silver-treated activated carbon, it could not be tested against the improved silver-treated, cellulose-precoatable, powdered carbon filter media of this invention. In addition, the effluent silver concentration from the cartridge employing only activated carbon treated entirely with silver averaged 54 ppb which is above the maximum limit of 50 ppb specified by the EPA. While the data on effluent silver concentration was sufficiently variable to produce a degree of uncertainty, it is clear from the other poor properties of such treated carbon that it was unsuitable for filtration to produce potable water.

COMPARATIVE TESTS OF NON-BACTERIOSTATICALLY TREATED, POWDERED, ACTIVATED CARBON WITH THE FILTER MEDIA OF THIS INVENTION

Hard water from a private deep well in Northbrook, Ill., was demineralized by dual bed ion exchange followed by a single mixed bed ion exchanger for final polishing and pH control. This highly purified water was mixed with tap water bypassing the ion exchange system to produce water containing 20–40 ppm total dissolved solids, verified by a commercial conductivity meter which monitored the water quality continuously throughout the test. Finally, the test water was passed through a column of "ordinary" granular activated carbon (containing no bacteriostat), which served as a breeder tank for the bacteria naturally indigenous to the water supply. The system was maintained at 20–40 psi throughout the test. Plumbing materials were brass and plastic only, and the test water was verified to contain no detectable dissolved copper.

In order to bacterially contaminate the water for test purposes, a *Pseudomonas fluorescens* culture (ATCC 13525) was propagated on tryptone-glucose extract agar slants and transferrd to Difco m-TGE broth for growth at room temperature. One ml of a 24-hour culture was used to innoculate one gallon of sterile tap water fortified with 30 ml of the same broth (minimal media) for 24 hours. Just before the time of artificially contaminating the system, a measured aliquot of this secondary 24-hour culture was added to a second gallon of sterile tap water. This diluted culture was immediately fed into the test system with a proportioning feeder pump calibrated to deliver 200 ml/min at the rate of two pulses/sec for 15 minutes before the initial "influent" sample was taken. The contaminated water passed through a mixing tank before entering the module bearing the six filters being tested and the "influent" sample port. The feeder pump rate and dilution factor necessary to produce the desired level of bacteria in the water were determined in advance.

All samples were collected in 500 ml Erlenmeyer flasks which were dry-heat sterilized (greater than 200°

C. for more than 12 hours). The brass sampling ports were thoroughly flamed on the outside just prior to sampling. Each sample, about 450 ml, was shaken vigorously before pouring 100 ml aliquots into duplicate, sterile, bacteriological sample bottles and duplicate polyethylene bottles for silver analysis. Just before sampling, the bacteriological sample bottles were fortified with one ml of neutralizing solution (Chambers thioglycollate thiosulfate solution), and the silver sample bottles were treated with the required amount of concentrated nitric acid. All analysis were begun within 30 minutes of sampling. Samples from test and control units were taken simultaneously in matched pairs to equalize any possible variations in the bacteriological quality of the influent water. The "influent" samples of the 24-hour holding periods, were taken from the "influent" sample port, which is served directly by the brass plumbing of the test module.

Each duplicate sample was analyzed for bacteria using the materials and methods prescribed in the *Federal Register*, Vol. 41, No. 152. Acidified samples were processed for silver analysis according to the procedure outlined in *Methods for Chemical Analysis of Water and Wastes*, U.S. Environmental Protection Agency, 1971, to concentrate the silver ten-fold before quantifying by atomic absorption spectrometry. Standards and blanks were carried through the entire procedure. In analyzing the standard samples recoveries of greater than 90% were achieved, and the standard deviation was found to be ±5 ppb at the 30 ppb level.

TABLE 1

| Schedule | | Unit No. | Time | Record of Test Conditions | | | | | | |
|---|---|---|---|---|---|---|---|---|---|---|
| | | | | Cumulative Gallonage | Influent* Flow Rate gpm | Temp. °C. ± 1 | pH | Effluent Flow Rate gpm | Temp. °C. ± 1 | pH |
| Start | Test Unit | S-1 | 8:15 | 0 | ¾ | 16.5 | 6.9 | ¾ | 16.5 | 6.9 |
| | " | S-2 | A.M. | ↓ | ↓ | ↓ | ↓ | ↓ | ↓ | ↓ |
| | " | S-3 | | ↓ | ↓ | ↓ | ↓ | ↓ | ↓ | ↓ |
| | Control Unit | C-1 | | ↓ | ↓ | ↓ | ↓ | ↓ | ↓ | ↓ |
| | " | C-2 | | ↓ | ↓ | ↓ | ↓ | ↓ | ↓ | ↓ |
| | " | C-3 | | ↓ | ↓ | ↓ | ↓ | ↓ | ↓ | ↓ |
| 25% of Filter Life | Test Unit | S-1 | 4:30 | 375 | | | | | | |
| | " | S-2 | P.M. | ↓ | | | | | | |
| | " | S-3 | | ↓ | | | | | | |
| | Control Unit | C-1 | | ↓ | | | | | | |
| | " | C-2 | | ↓ | | | | | | |
| | " | C-3 | | ↓ | | | | | | |
| 8 Hr. Holding Period | Test Unit | S-1 | 4:30 | | | | | | | |
| | " | S-2 | P.M. | | | | | | | |
| | " | S-3 | ↓ | | | | | | | |
| | Control Unit | C-1 | ↓ | | | | | | | |
| | " | C-2 | 12:30 | | | | | | | |
| | " | C-3 | A.M. | | | | | | | |
| 50% of Filter Life | Test Unit | S-1 | 11:00 | 870 | ¾ | 22 | 6.9 | ¾ | 22 | 6.9 |
| | " | S-2 | A.M. | ↓ | ↓ | ↓ | ↓ | ↓ | ↓ | ↓ |
| | " | S-3 | | ↓ | ↓ | ↓ | ↓ | ↓ | ↓ | ↓ |
| | Control Unit | C-1 | | ↓ | ↓ | ↓ | ↓ | ↓ | ↓ | ↓ |
| | " | C-2 | | ↓ | ↓ | ↓ | ↓ | ↓ | ↓ | ↓ |
| | " | C-3 | | ↓ | ↓ | ↓ | ↓ | ↓ | ↓ | ↓ |
| 75% of Filter Life | Test Unit | S-1 | 4:30 | 1,125 | | | | | | |
| | " | S-2 | P.M. | ↓ | | | | | | |
| | " | S-3 | | ↓ | | | | | | |
| | Control Unit | C-1 | | ↓ | | | | | | |
| | " | C-2 | | ↓ | | | | | | |
| | " | C-3 | | ↓ | | | | | | |
| 8 Hr. Holding Period | Test Unit | S-1 | 4:30 | | | | | | | |
| | " | S-2 | P.M. | | | | | | | |
| | " | S-3 | ↓ | | | | | | | |
| | Control Unit | C-1 | ↓ | | | | | | | |
| | " | C-2 | 1:40 | | | | | | | |
| | " | C-3 | A.M. | | | | | | | |
| 95% of Filter Life | Test Unit | S-1 | 8:30 | 1,425 | ¾ | 22 | 7.3 | ¾ | 22 | 7.3 |
| | " | S-2 | A.M. | ↓ | ↓ | ↓ | ↓ | ↓ | ↓ | ↓ |
| | " | S-3 | | ↓ | ↓ | ↓ | ↓ | ↓ | ↓ | ↓ |
| | Control Unit | C-1 | | ↓ | ↓ | ↓ | ↓ | ↓ | ↓ | ↓ |
| | " | C-2 | | ↓ | ↓ | ↓ | ↓ | ↓ | ↓ | ↓ |
| | " | C-3 | | ↓ | ↓ | ↓ | ↓ | ↓ | ↓ | ↓ |

*Alkalinity as $CaCO_3$ of tap water = 10 mg/l
Total Dissolved Solids of tap water = 25 mg/l
Hardness as $CaCO_3$ = 25 mg/l artificially contaminated water, both before and after

TABLE II

| Schedule | | Unit No. | BACTERIOLOGICAL AND CHEMICAL TEST RESULTS | | | |
|---|---|---|---|---|---|---|
| | | | Microorganisms/ml | | Silver (ppb) | |
| | | | Influent | Effluent | Influent | Effluent |
| Start | Test Unit | S-1 | 0 | 2 | *<5 | <5 |
| | " | S-2 | ↓ | 0 | ↓ | 8 |
| | " | S-3 | ↓ | 3 | ↓ | <5 |
| | Control Unit | C-1 | ↓ | 1 | ↓ | |
| | " | C-2 | ↓ | 1 | ↓ | |
| | " | C-3 | ↓ | 30 | ↓ | |

TABLE II-continued
BACTERIOLOGICAL AND CHEMICAL TEST RESULTS

| Schedule | Unit No. | | Microorganisms/ml | | Silver (ppb) | |
|---|---|---|---|---|---|---|
| | | | Influent | Effluent | Influent | Effluent |
| 50% of Filter Life | Test Unit | S-1 | 1 | 1 | | <5 |
| | " | S-2 | ↓ | 1 | | <5 |
| | " | S-3 | ↓ | 1 | | <5 |
| | Control Unit | C-1 | ↓ | 1 | | |
| | " | C-2 | ↓ | 7 | | |
| | " | C-3 | ↓ | 2 | | |
| Addition of Artificially Contaminated Water | Test Unit | S-1 | 650 | | | |
| | " | S-2 | ↓ | | | |
| | " | S-3 | ↓ | | | |
| | Control Unit | C-1 | ↓ | | | |
| | " | C-2 | ↓ | | | |
| | " | C-3 | ↓ | | | |
| 24 Hr. Holding Period at 50% of Filter Life* | Test Unit | S-1 | 775 | 2 | | 6 |
| | " | S-2 | ↓ | 0 | | 8 |
| | " | S-3 | ↓ | 1 | | 7 |
| | Control Unit | C-1 | ↓ | 31 | | |
| | " | C-2 | ↓ | 85 | | |
| | " | C-3 | ↓ | 1,250 | | |
| 95% of Filter Life | Test Unit | S-1 | 2 | 3 | | 14 |
| | " | S-2 | ↓ | 1 | | 13 |
| | " | S-3 | ↓ | 1 | | 11 |
| | Control Unit | C-1 | ↓ | 2 | | |
| | " | C-2 | ↓ | 1 | | |
| | " | C-3 | ↓ | 0 | | |
| Addition of Artificially Contaminated Water | Test Unit | S-1 | 5,400 | | | |
| | " | S-2 | ↓ | | | |
| | " | S-3 | ↓ | | | |
| | Control Unit | C-1 | ↓ | | | |
| | " | C-2 | ↓ | | | |
| | " | C-3 | ↓ | | | |
| 24 Hr. Holding Period at 95% of Filter Life* | Test Unit | S-1 | 33,000 | 315 | | 11 |
| | " | S-2 | ↓ | 625 | | 11 |
| | " | S-3 | ↓ | 715 | | 10 |
| | Control Unit | C-1 | ↓ | 3,250 | | |
| | " | C-2 | ↓ | 1,150 | | |
| | " | C-3 | ↓ | 1,450 | | |

Artificially contaminated water control - org/ml = at 50% 650 at 95% 5,400
*5 ppb is the lower limit of detection.

DISCUSSION OF COMPARATIVE TEST RESULTS

The generally low level of bacteria present in the system is notable. The breeder tank of activated carbon was included specifically to propagate the native bacteria, but for some reason it was not effective. The ion exchange demineralizing system would be expected to kill the bacteria in the main stream, of course, due to the extremes of pH produced, and it appears that the tap water by-pass did not supply a significantly large population of organisms. Bacterial counts did achieve moderately high levels by the end of the test, however, and did demonstrate the absence of toxic or inhibitory conditions in the system.

The efficacy of the silver-treated units of this invention (units S-1, S-2 and S-3) can be evaluated by studying the bacteriological test results contained in Table II. At start up and two other instances, the number of bacteria present in both the invention units (S 1-3) and the control units (C 1-3) is so low that a statistical analysis would be meaningless. It is notable that in these cases the samples were taken during periods of continuous flow. There are two reasons for the low levels of bacteria found. One reason is that, until artificial contamination was purposely introduced, few bacteria were actually present in the system. The other, and more important, reason is that the precoat filtration method achieves unusually fine filtration. Many bacteria are physically removed, and high bacterial counts are generally not found in the effluents of these filters, even without a bacteriostat, during continuous use. During extended period of non-use, bacteria entrapped within the filter propagate, and some daughter cells are able to penetrate the filtration barrier. Nearly all of these bacteria are quickly washed away as soon as the water resumes flowing. Samples taken during these conditions are represented after the two 24-hour holding periods. At 50% of filter life, with 775 bacteria/ml going into the filter, the average control effluent in C 1-3 was 445, and the average effluent from the filtration media/units of this invention was 1. At 95% of filter life, with 33,000/ml going in, the controls averaged 1950/ml in the effluent, and the silver-treated units of this invention produced an average of only 552 organisms per ml. These figures show that the mixed cellulose/precoat powdered carbon filter media of this invention is significantly effective in inhibiting the growth of such bacteria entrapped within the filter.

COMPARATIVE TESTING COLIFORM BACTERIA SUPPRESSION DURING STAGNANT PERIODS

A most important aspect of filter effectiveness can be appreciated in the fact that they are not always in use. During flow conditions there is natural variation in the porosity from filter to filter which explains occasional higher counts of bacteria passing through the filters. However, most filters pass higher numbers of bacteria after an extended period of stagnation during which bacteria which has flowed into the filter has the opportunity to propagate therein. Upon start-up of the filter, that is, upon opening the tap and commencing the water flow after the period of stagnation, there can be a very high count of bacteria in the initially drawn water. The following test protocol shows the results of sampling two control filters employing powdered carbon filter materials as compared to two filters containing the silver-treated cellulose/powdered carbon filter media of this invention, called silver 1 and silver 2 in the following example.

Four filters as described above were prepared, two using the powdered carbon material without silver, and two using the filter media of this invention. These filters were inserted into quick-change heads, Model QC-4 of Everpure, in a laboratory test module. The module was supplied with softened Westmont, Ill. water, dechlorinated by a large granular activated carbon bed followed by fine filtration by a large precoat filter. The effluent plumbing from each filter and the influent sample port was served by a 1.0 gpm flow controller and a timer-activated solenoid. Coliform organisms were artificially added just before the manifolding leading to the four standard QC-4 heads containing the test filters. These organisms were *Enterobacter aerogenes* (ATCC 15038), a species believed by some to be the most vigorous and hardy member of the coliform group. They were acclimated for 18 hours in sterile, dechlorinated tap water with 0.4% lactose broth. After passing 1,735 gallons through each filter, this charge was changed to the use of 24-hour agar slants, the organisms being transferred without intentional nutrients. The choice of organisms, the water pretreatment and the acclimation in minimal media were all designed to produce conditions most favorable for optimum coliform survival. The media containing the coliforms were pumped into the inflowing feedwater so that the coliform would collect in filters prior to the stagnation tests.

The units were operated for several days, 1,000 gallons through each filter, to accumulate a high concentration of organisms before bacteriological sampling was begun. 1-liter samples were taken in sterile flasks immediately after overnight or weekend downtimes. These were thoroughly mixed before transferring portions to sterile bacteriological sample bottles and were processed within one hour by *Standard Methods* procedures for Total Coliforms. The influent sample port was always sampled first. The data is collected and shown below in Table III.

TABLE III

| IN-FILTER COLIFORM BACTERIOSTATICITY | | | | |
|---|---|---|---|---|
| Stagnation Period | Meter Reading at × Gallons | Unit or Sample | | Coliforms/ 100 ml Upon Start-Up | Hours Stagnant |
| 1 | 1002 | Influent | | 810 | |
| | | Effluent: | Control 1 | 13 | |
| | | Effluent: | Control 2 | 5 | 17 |
| | | Effluent: | Silver 1 | <1 | |
| | | Effluent: | Silver 2 | <1 | |
| 2 | 1434 | Influent | | 2500 | |
| | | Effluent: | Control 1 | 10 | |
| | | Effluent: | Control 2 | 15 | 17 |
| | | Effluent: | Silver 1 | <1 | |
| | | Effluent: | Silver 2 | 1 | |
| 3 | 1674 | Influent | | 52000 | |
| | | Effluent: | Control 1 | 25 | |
| | | Effluent: | Control 2 | 110 | 68 |
| | | Effluent: | Silver 1 | 1 | |
| | | Effluent: | Silver 2 | <1 | |
| 4 | 1980 | Influent | | 320000 | |
| | | Effluent: | Control 1 | 650 | |
| | | Effluent: | Control 2 | 1300 | 68 |

TABLE III-continued

| IN-FILTER COLIFORM BACTERIOSTATICITY | | | | |
|---|---|---|---|---|
| Stagnation Period | Meter Reading at × Gallons | Unit or Sample | | Coliforms/ 100 ml Upon Start-Up | Hours Stagnant |
| | | Effluent: | Silver 1 | 2 | |
| | | Effluent: | Silver 2 | 7 | |
| 5 | 2220 | Influent | | 52000 | |
| | | Effluent: | Control 1 | 120 | |
| | | Effluent: | Control 2 | 2700 | 17 |
| | | Effluent: | Silver 1 | 14 | |
| | | Effluent: | Silver 2 | 140 | |

DISCUSSION OF STAGNANCY TEST RESULTS

The coliform-containing water was passed into the four test units continuously by pump until 1,002 gallons had accumulated on the flow meter. At that point in time, the flow was stopped, and the first stagnational period of 17 hours (overnight) was begun. Immediately upon termination of that stagnation period, the water flow was started, and the influent and effluent sample ports were tested. The influent port was tested first, and as shown in stagnation period 1, 810 coliforms/100 ml were assayed. The effluent from each of the four test filters was then collected and assayed showing the figures in column 4 of Table III. Thereafter, coliforms were continuously added for another 200 gallons until meter reading 1242 was reached, at which time the system was shut down for a weekend.

The following Monday there commenced pumping another 192 gallons of water containing the artificially added coliforms through the test bench set-up until meter reading 1434 gallons, at which time a 17-hour stagnation period (period 2) was started. At the end of that time, the influent port assayed 2500 coliforms per 100/ml, and the two controls in the range of 10-15, while the two filters of this invention assayed approximately 1 (identified as Silver 1 and Silver 2 in Table III in the third stagnation period).

Similarly, the balance of the table for stagnation periods 3, 4 and 5 can be understood. The improved coliform suppression in the two test filters containing the silver-treated cellulose/precoat carbon filtration media of this invention as compared to that of the two control filters is statistically highly significant, at the 99% confidence level, based on Student's "t" test.

While not wishing to be bound by theory, we have the following observations in regard to the principles of the present invention. We have found quite unexpectedly that rather than following the prior art methods of evenly distributing silver throughout filter materials, by segregating the bacteriostatic property of the silver into a different material, we are able to obtain an improved filtration medium. We have been able by the mixed filtration medium of this invention to maintain the adsorptive and precoatable properties of the powdered, activated carbon filter material without any increase in density or drop-off. By use of silver-impregnated inert material (e.g., cellulose), we are able to get slow release of the silver atoms which disperse into, or penetrate the interstitial carbon which acts as the filtration medium. We believe that the silver ions are thus only loosely absorbed onto the powdered, activated carbon filtration material where they are available to act effectively as bacteriostatic agents, but without adversely affecting the essential sorptive properties of the carbon.

In contrast, as noted by the comparative tests above, by directly treating the powdered carbon filtration material, the carbon properties are changed so that effective filtration cakes cannot be produced. Thus, the silver in the special filtration medium of this invention does not cause change in the chemical or hydraulic properties of the powdered carbon filtration material. The powdered carbon filtration material is not densified so there is no increase in fall-off. Indeed, by use of the inert material (e.g., cellulose), we are able to control the density of the mixed filtration medium so that there is even less tendency toward fall-off. Unexpectedly, we found that by this process of segregation, smaller quantities of silver bound to the cellulose still provide bacteriostatic protection for the entire mixed filtration medium. Thus, one of the advantages of this invention is that only small quantities of inert material (e.g., cellulose) need be treated to provide the overall bacteriostatic properties of the mixed filter media. This means that there is no possibility of the powdered carbon filtration material losing any of its sorptive properties as a result of the combination of the components of the mixed filter media of this invention. We have also been able to overcome the disadvantage of biodegradability of the cellulose, and its inability to be formable into a precoat-type filter cake. We decrease the raw material and processing costs involved in use of silver as a bacteriostatic agent, and also reduce the effluent silver quantities to below that currently recommended by the EPA. We are able to improve or maintain the permeability of the filter cake to that suitable for superfine filtration in precoat-type of filters. Thus, the filters are able to retain their indigenous bacteria filtration properties.

We believe that in operation the filter medium of this invention there is a true synergistic effect in the following respects: The treatment of the inert material (e.g., cellulose) with the silver does not apparently so bind the silver to the cellulose that it cannot be slowly released (gradually dissolved or eluted) from the surface of the cellulose fibers to permeate the interstitial carbon powder. And, during such use, the silver does not appear to become so bound to the carbon that it adversely affects the permeability of the filter cake through densification, nor cause other physical or chemical changes in the carbon that affect it, such as producing "drop-off." Indeed, the silver appears to be adsorbed onto the surface of the carbon in a manner not fully understood yet which gives full range to the bacteriostatic effect of the silver, while permitting the carbon to exhibit improved, as compared to silver-treated carbon, properties of filtration of pollutant solids, organics and gases. This result is entirely unexpected as it was thought that the segregation and providing only a minor portion of the entire filter with a bacteriostatic property would lead to lower overall bacteriostatic effect in the combined filter media. Indeed, the filter media of this invention may be better termed a "combined" filter media than a mixture.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be. For example, we can use any dispersible type of fiber within the specification set forth herein. In addition, we can use any powdered carbon below 200 mesh which has the precoatability properties. Filters using the media of this invention are useful for removal of gases typically producing bad taste in water, suspended solids producing turbidity in water, including fine particles down to 1 micron, asbestos below 1 micron, and removal of organics and bacteria. The carbon useful herein may be any commercially available activated carbon of potable water filtration quality.

We claim:

1. A bacteriostatic water filtration media composition for use on the inlet side of precoat type water filters having a filter element on which said filtration media becomes coated in operation:
   (a) a first, adsorbent component comprising a powdered activated carbon filter material;
   (b) a second, silver-providing component, comprising an inert, water-insoluble, non-toxic, precoatable, fibrous material impregnated with 1 to 5 weight percent (on a dry basis) of elemental silver formed from reduction of an inorganic silver salt;
   (c) said second, elemental silver-providing component being intimately and uniformly dispersed within said first, adsorbent component to form said water filtration media composition;
   (d) said second, elemental silver-providing component being present in said composition in a range of from 1 to 10 percent by weight on a dry basis to provide bacteriostatic effect throughout the entire filtration media for the life of the filter;
   (e) said second component providing upon contact of water therewith slow release by dissolution of said elemental silver therefrom and dispersion of said dissolved elemental silver throughout said composition permitting said dissolved elemental silver to be effectively present in association with the carbon of said filtration media composition to provide said bacteriostatic effect during rest and during water flow throughout the entire filtration media thereby reducing the rate of plugging the filter element by bacterial growth; and
   (f) said media composition of said elemental silver-providing second component dispersed in said first adsorbent component having the properties of:
      (i) precoatability on the inlet side of a water filtration surface without:
         (a) inhibiting carbon adsorptive properties, or
         (b) causing densification of said carbon to promote precoat fall-off from said filtration surfaces
      (ii) inhibiting in-situ propagation of bacteria internal to the filter during stagnant periods resulting in reduction in bacterial growth through the filter element to the outlet side and elution of bacteria therefrom upon restart of water flow; and
      (iii) elution of less than 50 ppb of total silver during the life of the filter.

2. A bacteriostatic water filtration media composition as in claim 1 wherein said material is a wettable cellulose comprising individual fibers of sizes in the range of 10–1000 $\mu$m, diameters in the range of from 2–25 $\mu$m, and dry tap density of less than 0.4 g/cc.

3. A bacteriostatic water filtration media composition as in claim 2 wherein said silver is present in said cellulose in an amount of from 2 to 4 weight percent on a dry basis.

4. A bacteriostatic water filtration media composition as in claim 5 wherein said activated carbon material contains a minor percentage of a filter aid free of bacteriostatic silver or silver compounds selected from the group of diatomaceous earth, silica, alumina, and mixtures thereof.

5. A water filter assembly comprising in operative combination:
   (a) a housing for a water filter element;
   (b) a water filter element disposed therein;
   (c) an impure water inlet;
   (d) a purified water outlet;
   (e) means for directing said impure water through said element; and
   (f) a filtration media disposed in association with said filter element, said filtration media having the composition of claim 1.

6. A water filter assembly as in claim 5 wherein said composition is as in claim 2.

7. A water filter assembly as in claim 5 wherein said composition is as in claim 3.

8. A water filter assembly as in claim 5 wherein said composition is as in claim 4.

9. Method of filtering water comprising the steps of:
   (a) providing a water filter element in a housing having the properties of supporting a filtration media while permitting water to pass therethrough;
   (b) providing a water filtration media as in claim 1 in said housing;
   (c) introducing impure water requiring filtration into said housing containing said water filter element;
   (d) contacting said water with said media so that there is a simultaneous action of:
      (i) adsorption by said activated carbon of materials including particulates and organics, and
      (ii) inhibition of bacterial growth by said silver-providing component throughout the entire filtration media during stagnant and water flow periods, thereby to treat said water;
   (e) passing said treated water through said filter element to filter said water; and
   (f) passing said treated and filtered water from said housing for use.

10. Method of water filtration as in claim 9 wherein:
   (a) said contacting step includes passing said impure water into said housing and through said element in a manner that provides for precoating of said media on said filter element.

11. Method of water filtration as in claim 10 wherein:
   (a) said media composition is the media of claim 5.

12. Method of water filtration as in claim 10 wherein:
   (a) said media composition is the media of claim 6.

* * * * *